United States Patent
Lang et al.

(10) Patent No.: US 11,474,846 B2
(45) Date of Patent: Oct. 18, 2022

(54) CONTROLLER FOR BRIDGING DATABASE ARCHITECTURES

(71) Applicant: Microsoft Technology Licensing, LLC, Redmond, WA (US)

(72) Inventors: Willis Lang, Edina, MN (US); Karthik Raman, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 579 days.

(21) Appl. No.: 16/509,306

(22) Filed: Jul. 11, 2019

(65) Prior Publication Data

US 2021/0011747 A1 Jan. 14, 2021

(51) Int. Cl.
G06F 9/455 (2018.01)
G06F 16/25 (2019.01)
G06F 9/54 (2006.01)

(52) U.S. Cl.
CPC .............. G06F 9/4552 (2013.01); G06F 9/54 (2013.01); G06F 16/258 (2019.01)

(58) Field of Classification Search
None
See application file for complete search history.

(56) References Cited

U.S. PATENT DOCUMENTS

| | | | | |
|---|---|---|---|---|
| 8,990,551 | B2 * | 3/2015 | Shafi | G06F 9/5011 713/100 |
| 8,995,789 | B2 * | 3/2015 | Ao | G06T 1/60 382/284 |
| 9,384,052 | B2 * | 7/2016 | Dalal | G06F 9/5027 |
| 9,712,438 | B2 * | 7/2017 | Patel | H04L 61/106 |
| 10,789,217 | B2 * | 9/2020 | Chalakov | G06F 16/137 |
| 2009/0158292 | A1 | 6/2009 | Rattner et al. | |
| 2019/0238525 | A1 * | 8/2019 | Padmanabhan | H04L 63/0428 |
| 2020/0106477 | A1 * | 4/2020 | Nanni | H04B 3/52 |
| 2021/0011747 | A1 * | 1/2021 | Lang | G06F 16/258 |
| 2021/0320859 | A1 * | 10/2021 | Yazici | H04W 28/0823 |

OTHER PUBLICATIONS

"Ingres 11.0", Retrieved From: http://supportactian.force.com/help/servlet/fileField?idBEf3000000TYtf, Feb. 19, 2018, 372 Pages.
Jarvinen, et al., "MICS Messaging Platform: Architecture, Design and Routing", In Proceedings of the Military Communications Conference, Oct. 31, 2010, pp. 1893-1898.
"International Search Report and Written Opinion Issued in PCT Application No. PCT/US20/033488", dated Jul. 22, 2020, 11 Pages.

* cited by examiner

*Primary Examiner* — Kim T Nguyen
(74) *Attorney, Agent, or Firm* — Alleman Hall Creasman & Tuttle LLP (57) ABSTRACT

A method of bridging a first database and a second database. The method includes maintaining a state machine representing a state of a virtual node in the first database, wherein the state of the virtual node conforms to a native protocol for native nodes of the first database, said native protocol of the first database differing from a foreign protocol of the second database. The method further includes receiving an incoming message for the virtual node from one of the native nodes according to the native protocol, and based on the incoming message, accessing the second database. The method further includes updating the state of the virtual node based on the incoming message according to the native protocol, and based on the state of the virtual node as updated, sending an outgoing message to one or more of the native nodes according to the native protocol.

20 Claims, 4 Drawing Sheets

CONTROLLER FOR BRIDGING DATABASE ARCHITECTURES

BACKGROUND

Database systems are used to provide reliable access to geospatially replicated data. Modern database architectures may provide advantages in scalability, throughput, and/or capacity. However, a computer technology may use a different database architecture, and it may be costly to reconfigure the existing computer technology to avoid using the different database architecture.

SUMMARY

A method of bridging a first database and a second database includes maintaining a state machine representing a state of a virtual node in the first database, wherein the state of the virtual node conforms to a first native protocol for native nodes of the first database, said first native protocol of the first database differing from a second, different native protocol of the second database. The method further includes receiving an incoming message for the virtual node from one of the native nodes according to the first native protocol, and based on the incoming message, accessing the second database. The method further includes updating the state of the virtual node based on the incoming message according to the first native protocol, and based on the state of the virtual node as updated, sending an outgoing message to one or more of the native nodes according to the first native protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Computer applications store data for a wide variety of purposes (e.g., non-limiting examples include user data, scientific data, application-specific state data, etc.). It is often desirable for stored data to be stored redundantly at a plurality of computer devices. Such redundancy may mitigate the risks of data loss, increase availability, and provide other benefits. When data is stored at a plurality of computer devices, the multiple different computer devices may be able to cooperate to provide efficient access to the data. For example, the plurality of computer devices may be concurrently operable to access the data, so that the data can be accessed by multiple other computers. Furthermore, the multiple different computer devices may offer different latencies for serving the data to different other locations (e.g., due to being geospatially distributed and/or due to different infrastructure availability) and access to the data can be provided by a particular one of the plurality of computer devices to achieve a desired latency.

Database technologies are frequently employed to organize and access data that is redundantly stored at a plurality of different computer devices. Data may be organized in a database with a specific database architecture. A database architecture defines the kinds of data that can be stored, and the manner in which the database can be organized. Furthermore, database architectures for storing data on a plurality of computers are typically constrained to operate according to a predefined database protocol. A database protocol includes specific rules regarding how the plurality of computers are required to store/access data and communicate with other computers. Computers for implementing a database may be referred to herein as "nodes." In some examples, nodes of a database may be arranged in one or more data centers, e.g., corresponding to geospatial locations housing physical infrastructure. Alternately or additionally, nodes may be arranged in any suitable network structure. In general, nodes of a database may communicate with any other nodes of the database, irrespective of whether they are organized within the same or different data centers, etc.

Non-limiting examples of database architectures include CosmosDB™, MongoDB™, Cassandra™, HBase™, Vertica™, and SQL Parallel Data Warehouse™. Each of these database architectures has an associated, architecture-specific database protocol. Nodes from databases with different protocols are generally not interoperable, e.g., a MongoDB™ node is not configured to participate in a Cassandra™ database, as the MongoDB™ node is configured to use the MongoDB™ protocol which is incompatible with the Cassandra™ protocol.

In many examples, database architectures are configured for infrastructure-as-a-service (IAAS) or on-premise installation. In an on-premise installation, a database is installed on dedicated physical hardware (e.g., hardware owned and operated by a purveyor of a computer application using the database). In IAAS installations, a database is installed on provisionable hardware infrastructure resources (e.g., a cloud computing system). In either case, the database is configured to a particular hardware infrastructure with particular, pre-installed capabilities. As non-limiting examples, MongoDB™ and Cassandra™ are database architectures which are configured for IAAS or on-premise installation. Although these database architectures may be installed on any suitable infrastructure, the resulting database configuration is specific to that infrastructure. Scaling the database (e.g., to vary throughput and/or storage capacity, or to add any other new computational capability such as access to a new hardware device, new network hardware, a licensed software product, etc.) requires the installation and/or provisioning of new on-premise and/or IAAS infrastructure, followed by the installation and configuration of new database nodes on the new hardware. There is typically no way to directly scale the capabilities of one or more of the individual nodes. As a result, scaling capabilities of a database may be costly.

Platform-as-a-service (PAAS) database architectures may provide advantages in scalability, particularly with regard to throughput, and/or capacity. For example, the CosmosDB™ database architecture is a PAAS computer technology that allows a user to instantiate a scalable database that is managed by the platform. The scalable database can be configured to have any suitable desired throughput and/or capacity. For example, if throughput and/or capacity demands increase during operation, the throughput and/or capacity can be improved to match demand, without requiring any explicit installation and/or provisioning of infrastructure. The platform manages underlying computational infrastructure to provide a database with the configured amount of throughput and storage capacity. PAAS databases may provide other benefits, such as being geospatially distributed. For example, CosmosDB™ enables replication in multiple different geographic locations, and the different locations for replication can be configured to automatically cause data to be geospatially distributed and stored at the different locations, without requiring the installation/modification of infrastructure in the different locations.

Existing computer infrastructure may be improved in many cases by using a PAAS database. Existing computer systems may, however, employ a different database architecture (i.e., different from PAAS) that is existing and already in place. It may be desirable to improve the throughput and/or storage capacity of an existing technology by using a PAAS database such as CosmosDB™ instead of, or in addition to the existing database architecture. For example, the platform-as-a-service database may be used in addition to the existing database architecture to provide additional redundancy and/or to improve storage capacity and/or throughput. As another example, the platform-as-a-service database may be used to replace the existing database e.g., to simplify management of database infrastructure by reducing the burden from managing on-premise and/or IAAS infrastructure.

It may be costly to reconfigure an existing computer technology to begin using a PAAS architecture instead of or in addition to the existing database architecture. In particular, the existing computer system may rely on data that is stored in the existing database architecture, and as such it may be difficult or impossible to avoid using the existing database architecture. For example, there may be a large amount of data in the existing database that is necessary for continued functioning of the computer system, which would need to be migrated into the PAAS database. Database migration may be costly (e.g., in terms of requiring human programmer expertise, causing down-time for the computer technology, etc.).

The present disclosure includes systems and methods for bridging two different databases with different architectures. The disclosed techniques enable a first database (e.g., an IAAS and/or on-premise database) to be extended with additional capabilities provided by a second database. In some examples, the second database is a PAAS database. Alternately or additionally, the second database may include an IAAS database and/or an on-premise database. In some examples, a controller maintains a state machine representing a "virtual node" in the first database. The virtual node does not correspond to specific computer infrastructure, but the controller causes messages to be sent to/received from the native nodes of the first database, according to the first database protocol (a protocol that is native to the first database), and on behalf of the virtual node. The aggregate behavior of the virtual node as evident in the protocol messages is all consistent with the protocol of the first database, as though a native node were added to the first database by configuring new infrastructure. As such, the first database can be extended without any changes to the architecture of the first database, and without actually configuring new IAAS or on-premise infrastructure. The storage and computational capabilities of the virtual node are implemented via accessing the second database. The virtual node participates in communication with native nodes of the first database, according to the native protocol defined by the first database architecture. As such, the virtual node can inform other nodes about its capabilities, fulfil requests to access/process data, etc.

Accordingly, the capabilities of the second database (e.g., throughput and storage capacity) can be used to extend those of the first database. The first database can thereby have an increased storage capacity, additional redundancy, and/or faster/higher throughput, without requiring any changes to the underlying infrastructure of the first database. Furthermore, the second database can begin to automatically participate in the replication of data according to the protocol of the first database so that the second database will eventually hold all of the data of the first database, e.g., to facilitate eventual migration to the second database. In cases where the second database has scalable computational capabilities (e.g., scalable throughput and/or storage capacity, as with a platform-as-a-service database such as CosmosDB™), these special computational capabilities may be scaled to vary the overall capability of the first database, again without requiring any changes to the underlying infrastructure of the first database. Accordingly, the techniques of the present disclosure allow development of computer technologies with better redundancy of data (e.g., resulting in lower likelihood of data loss and/or faster data access times), which can be more readily scaled to use an appropriate amount of computational resources (e.g., throughput and storage capacity can be scaled to match demand). In some examples, in addition to providing different and/or scalable performance characteristics (e.g., with regard to storage capacity and/or throughput), the second database may have data processing capabilities not provided by the first database. Accordingly, such data processing capabilities may be used to process data that is replicated in the first and second databases, in a manner that was not supported by the first database alone, thereby improving the overall data processing capabilities of the whole data replication system including the first database and the second database.

As an example, the second database may support operations for searching, selecting, and/or aggregating data, where such operations are not provided by the first database. As an example, the second database may support geospatial operations for searching/selecting/aggregating data based at least on an associated geographic location (e.g., to process data pertaining to a particular geographic location and/or to process data stored at a particular geographic location). For example, CosmosDB™ provides functionality for searching geospatial data in the GeoJSON™ format, including searching based on distances between points, intersections between lines, containment within polygonal regions, etc. This exemplary extra capability of the second database as compared to the first database is one non-limiting example, and the second database may have any suitable current or state-of-the-art capabilities not provided by the first database. Accordingly, any such capabilities of the second database may be used to augment the data processing capabilities of the whole data replication system including the first and second databases.

The present disclosure includes techniques for bridging databases having different database protocols. The techniques are described herein with regard to exemplary features of database protocols. However, the present disclosure is not limited to the examples shown herein, and the systems and methods described herein may be used to bridge any two databases having different protocols. In particular, the present approach includes maintaining a state machine for a virtual node according to the first database protocol, and causing the sending/receipt of messages to/from the native nodes according to the first database protocol. The second database may be accessed in any suitable fashion, e.g., to store/access data indicated by the messages according to the protocol. Accordingly, the present techniques may be applied anytime the first database protocol can be determined (e.g., from a specification or via reverse-engineering), as long as the second database can be accessed in some manner (e.g., even if the second database has an incompatible or unknown protocol). The virtual node interacts with the first database exclusively according to the first protocol, but with underlying capabilities provided by the entire second database. In some examples, the virtual node may act as a large-capacity node having relatively large throughput and/or storage capacity as compared to native nodes of the first database.

Non-limiting examples of features of a database protocol include specifications for different kinds of messages that nodes can send to one another. For example, a database protocol may specify a "heartbeat" message that a node can send to inform other nodes as to their presence in the database, computational capabilities, and current knowledge of the database (e.g., most recent database schema seen by that node). Accordingly, the database protocol may further specify how nodes should receive and optionally respond to heartbeat messages, e.g., by updating an internal representation of other nodes in the database.

As another example, a database protocol may specify one or more different types of "read" and "write" messages for accessing the data stored in the database. Database architectures and/or protocols may be designed to permit access to the data in any suitable fashion (e.g., according to any suitable implementation). As a non-limiting example, if a first node receives a message requesting a "read" to the database, the first node may have direct access to the relevant data and accordingly can return the relevant data. Alternately, the relevant data may be stored at some other, second node and the first node may send one or more other messages according to the protocol, to ensure that the other, second node eventually provides the relevant data.

In some examples, nodes may each be configured to replicate all of the data in the database, so that after new data is written into the database, each node eventually has direct access to the new data (e.g., by storing the new data in a storage device associated with the node). In these examples, the database protocol may ensure that data is eventually replicated at every node, while allowing for data being temporarily present at only some locations (e.g., immediately after new data is written, before it propagates to other nodes in the database according to the protocol). In other examples, nodes may be configured to replicate only some of the data in the database (e.g., each node may be responsible for a particular subset of the data, or any other suitable assignment of data to nodes). As a non-limiting example, Cassandra™ databases have a native protocol called "Gossip" in which nodes periodically and/or aperiodically send heartbeat and/or data messages to one or more other nodes.

Figure 1:
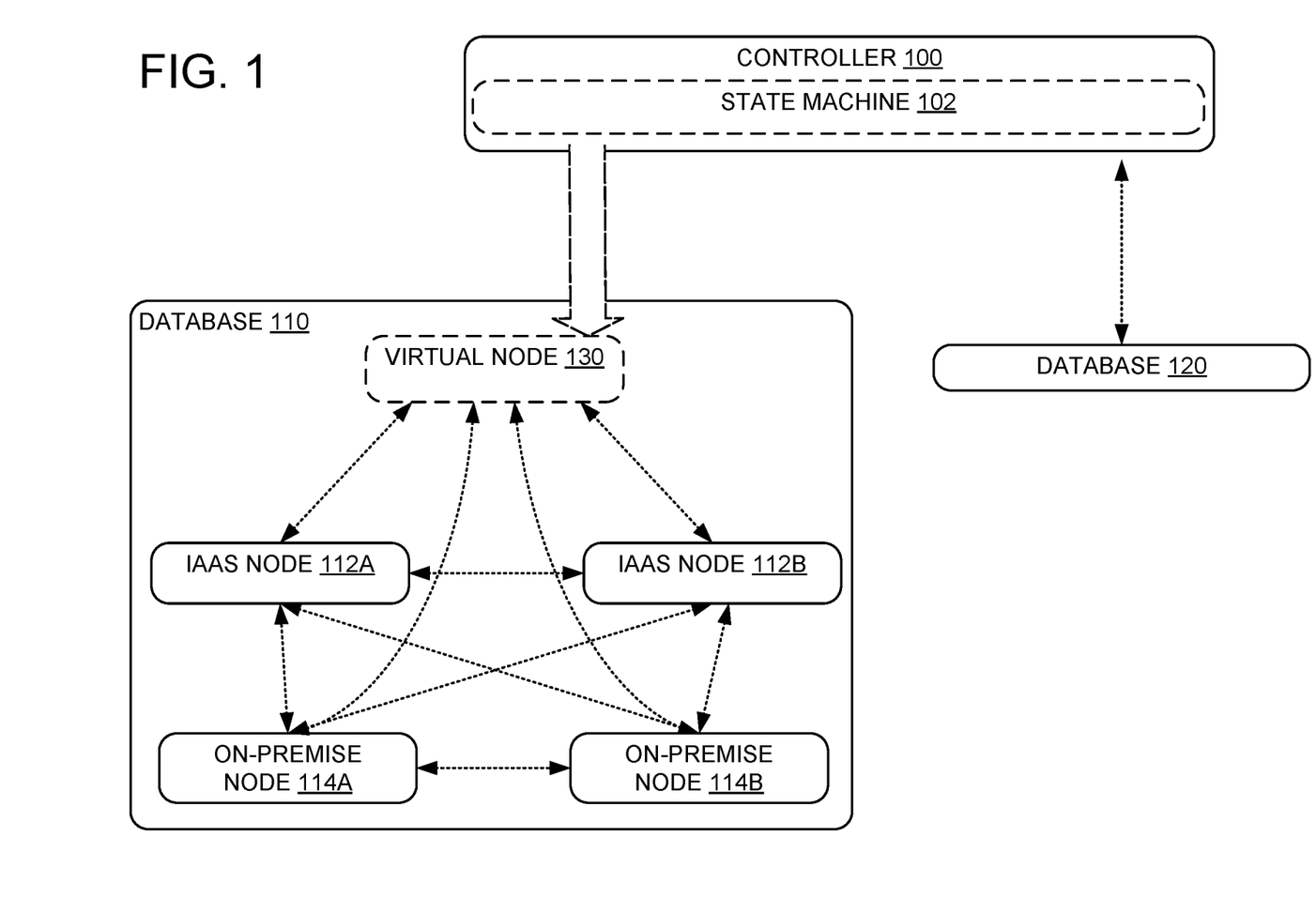
FIG. 1 shows a schematic view of an example controller bridging two different databases with different database architectures.

FIG. 1 shows an exemplary controller 100 for bridging two databases: a first database 110, and a second database 120. As an example, the first database may be a database used by an existing computer technology that has storage and/or throughput demands that are exceeding the current capabilities of the first database, and it may be believed that it would be costly to extend the infrastructure of the first database or to replace the first database. As an example, the first database may be a Cassandra™ database. In some examples, database 120 is a PAAS database, for example a scalable database such as CosmosDB™. Although controller 100 is described with regard to Cassandra™ and CosmosDB™, controller 100 may be used to bridge any suitable databases.

In the example, the first database 110 is implemented as a combination of four native nodes: on-premise nodes 114A and 114B, and IAAS nodes 112A and 112B. In some examples, these nodes may be organized into data centers, e.g., based on geospatial location of the nodes. In any case, the nodes are communicatively coupled to each other and configured to communicate according to a protocol of the first database 110. Although just two IAAS nodes (112A and 112B) and two on-premise nodes (114A and 114B) are shown in FIG. 1, database 110 may include any suitable number of IAAS and/or on-premise nodes. Although the nodes are shown being connected to each other node, any suitable network topology may be used (e.g., each node may be connected to any suitable subset of other nodes). It will be appreciated that large database systems may include hundreds, thousands or more nodes.

Controller 100 is configured to maintain a state machine 102 representing the state of a virtual node 130. Controller 100 is further configured to instantiate the virtual node 130 in the database 110 by causing the delivery and receipt of messages pertaining to virtual node 130, according to a native database protocol of the first database. As shown in FIG. 1, virtual node 130 behaves as though communicatively coupled to all of the native nodes of database 110, although this example connectivity is non-limiting and virtual node 130 may be connected to any suitable subset of nodes in database 110.

Controller 100 orchestrates such delivery/receipt of messages so that it appears as though virtual node 130 is a native node following the native database protocol. In particular, messages received by the native nodes of database 110 (IAAS nodes 112A and 112B, and on-premise nodes 114A and 114B) according to the native protocol appear consistent with there being a new native node exhibiting the behavior of virtual node 130. In some examples, the "virtual" status of virtual node 130 may be indistinguishable so that virtual node 130 appears to be a native node based on all observable qualities under the protocol. However, virtual node 130 need not correspond to any particular physical infrastructure. Instead, controller 100 ensures that messages are sent and received as though such a native node existed, ensuring that its behavior is consistent with the native protocol and the state machine 102. The behavior of virtual node 130 may be provided by any suitable combination of hardware and/or software, for example, by controller 110. In some examples, the behavior of virtual node 130 may be provided by controller 110 in cooperation with one or more worker nodes, as will be described below with regard to FIG. 3.

Controller 100 is further configured to access database 120, as required to respond to messages received by virtual node 130 (e.g., to access the database to retrieve data, replicate data, etc.) and to update state machine 102 accordingly. As a non-limiting example, if a message from IAAS node 112A designated for virtual node 130 indicates that a new data value should be stored in the database by virtual node 130, controller 100 may be configured to receive the message on behalf of virtual node 130, access database 120 to store the new data value, update state machine 102 to indicate that the new data value was stored, and send a response message back to IAAS node 112A indicating that the data was stored. Accordingly, controller 100 provides the behavior of virtual node 130 by accessing database 120.

The extension of database 110 with virtual node 130 does not require any changes or re-configuration, beyond the standard enrollment of a new node in database 110. Enrollment of a new node in database 110 is typically defined by the native protocol of database 110, based on the new node sending messages to existing nodes advertising its availability. Accordingly, enlisting virtual node 130 may be accomplished in any suitable fashion, for example, by controller 100 sending new messages to native nodes of database 110. Accordingly, computer technologies using database 110 can automatically have additional capabilities of database 120 (e.g., throughput, storage capacity, and/or scalability), without incurring any expense due to reconfiguration.

Figure 2:
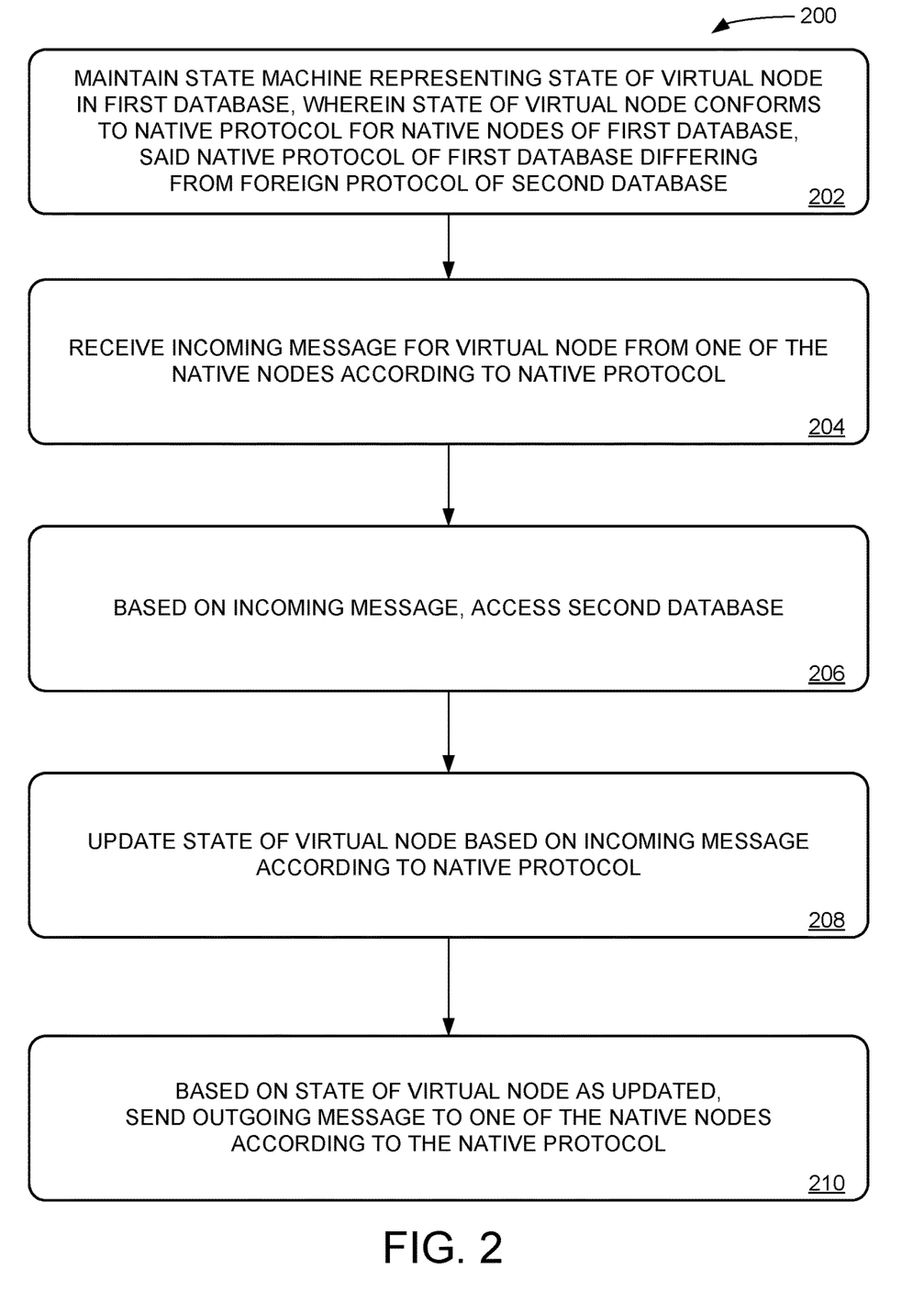
FIG. 2 shows an example method for bridging two different databases with different database architectures.

FIG. 2 shows a method 200 for bridging a first database and a second database. For example, method 200 may be implemented by controller 100. Method 200 is useable to bridge two databases having different, mutually incompatible protocols, e.g., where a first native protocol of the first database differs from a foreign protocol (e.g., a second, different native protocol) of the second database. In some examples, the second database is a PAAS database, and/or a geospatially distributed database. The techniques described herein may be applied to bridge any suitable choice of first database and second database. For example, the first database may have any first native protocol, and accordingly the second database may have any second, different native protocol. When the first native protocol and the second, different native protocol are not configured for interoperability, the second, different native protocol may be referred to herein as a foreign protocol. Accordingly, the techniques described herein may be used to bridge the first database and the second database, even when the second database has a foreign protocol that is not configured for interoperability with the native protocol of the first database At 202, method 200 includes maintaining a state machine representing a state of a virtual node in the first database. As far as can be determined by native nodes of the first database, the virtual node behaves exactly like a native node in the first database. In other words, the virtual node is conceptually a node in the first database, although it does not correspond to a particular infrastructure installation of the first database. The state of the virtual node, as represented by the state machine, conforms to the native protocol for native nodes of the first database: each possible state of the virtual node is a valid state for a native node of the first database, and furthermore, all of the possible transitions between states are valid state transitions according to the native protocol for the first database. The virtual node sends/receives messages according to the native protocol, e.g., according to the "Gossip" protocol for a Cassandra™ database, or more generally according to any suitable protocol for any database.

At 204, method 200 includes receiving an incoming message for the virtual node from one of the native nodes according to the first native protocol of the first database. In some examples, the incoming message is a heartbeat message from a native node of the first database. The heartbeat message may indicate any relevant characteristics of the native node, so that other nodes in the database can maintain an internal representation of the native node. Accordingly, updating the state of the virtual node includes updating an internal representation, held by the virtual node, of a state of the native node associated with the heartbeat message.

At 206, method 200 includes, based at least on the incoming message, accessing a second database. Accessing the second database may be accomplished in any suitable fashion, for example, accessing the second database may include sending/receiving messages to foreign nodes of the second database using the foreign protocol of the second database. Alternately or additionally, accessing the second database may include invoking an application-programming-interface (API) of the second database. In some examples, accessing the second database is implemented using one or more worker node computers configured for low-level access to the second database, as will be described further below. In some examples: accessing the second database includes invoking an application programming interface of the second database.

In some examples, the incoming message is a data payload message, according to the native protocol. For example, the data payload message may include update data designated for replication by the virtual node. Accordingly, accessing the second database based at least on the incoming message includes updating the second database to include the update data.

At 208, method 200 includes updating the state of the virtual node based at least on the incoming message according to the native protocol. For example, updating the state of the virtual node may include indicating that the incoming message was received and/or indicating that the database was accessed based at least on the incoming message. In general, updating the state of the virtual node may include any suitable changes to the state machine to ensure consistency with the valid states and/or state transitions for native nodes under the native protocol of the first database.

At 210, method 200 includes, based at least on the state of the virtual node as updated, sending an outgoing message to one or more of the native nodes according to the native protocol. In some examples, the incoming message is a data request message indicating requested data to be provided by the virtual node. Accordingly, accessing the second database based at least on the incoming message includes fetching the requested data from the second database, and the outgoing message includes the requested data.

In some examples, the outgoing message is a heartbeat message advertising a state of the virtual node according to the native protocol. For example, the heartbeat message may indicate that the virtual node was recently enrolled in the database, indicate a state of the database (e.g., database schema) assessed by the virtual node, and/or indicate a computational capability of the virtual node. In some examples, the second database is configured to vary a computational capability of the second database. For example, such variable computational capability may include a scalable database storage capacity and/or a scalable data processing throughput. Accordingly, the state machine may be configured to advertise, to one or more of the native nodes, a corresponding computational capability of the virtual node according to the native protocol. In some examples, the computational capability of the virtual node may be advertised by sending, to the one or more of the native nodes, a heartbeat message indicating the computational capability.

In addition to sending and/or receiving heartbeat messages and data payload messages, the virtual node behavior may include any other aspects of a protocol (e.g., sending/receiving other types of messages for changing schema, adhering to a defined data replication strategies, etc.).

Figure 3:
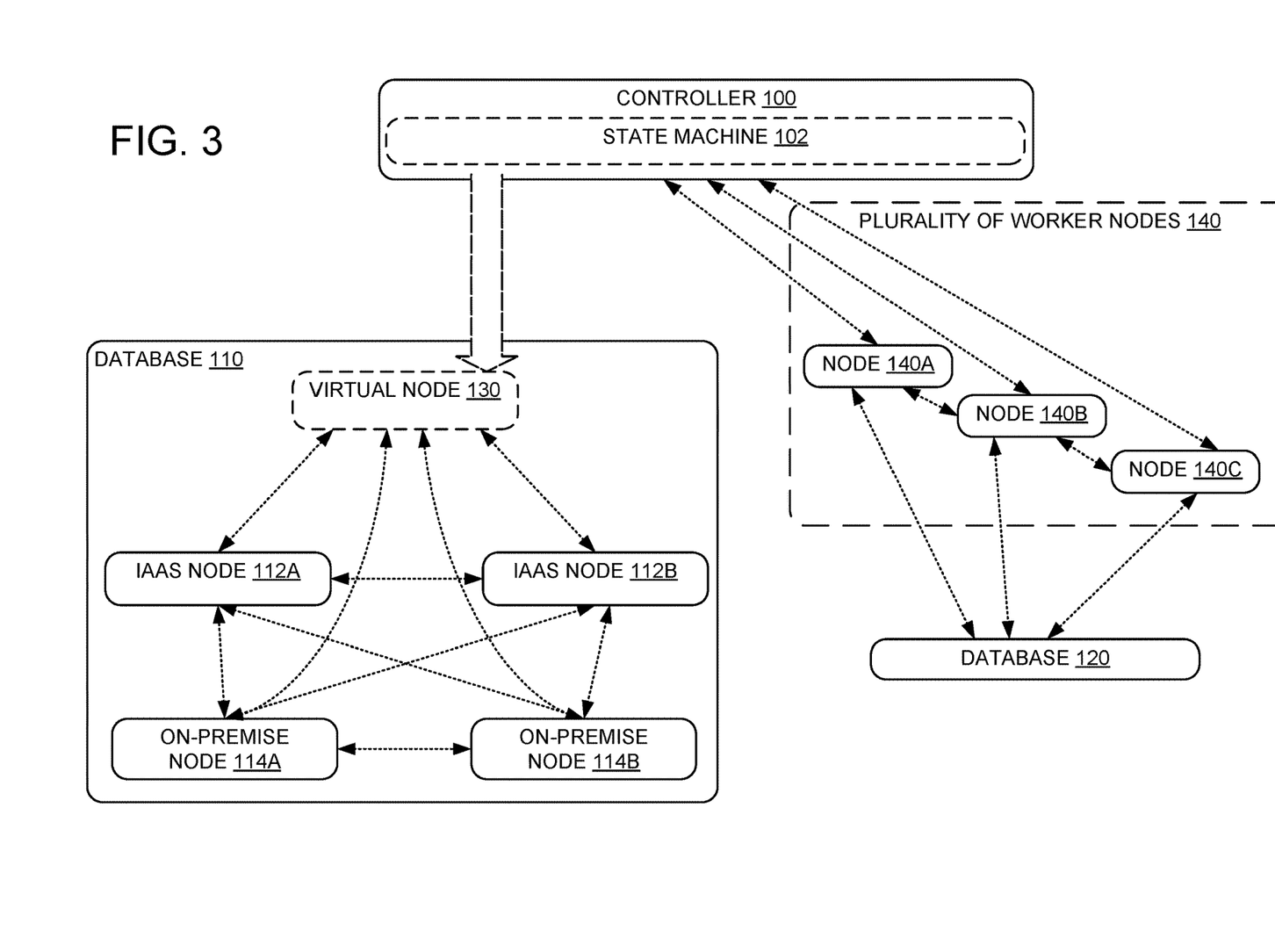
FIG. 3 shows a schematic view of an example controller communicating with a plurality of worker nodes to access a database.

FIG. 3 shows controller 100 of FIG. 1 bridging database 110 and 120. In some examples, as shown in FIG. 3, controller 100 is configured to access database 120 by causing a plurality of worker nodes 140 to communicatively couple to database 120. The worker nodes are configured to access database 120 in any suitable fashion. For example, the worker nodes 140 may be configured to access database 120 via an API of database 120, by sending/receiving messages to/from foreign nodes of database 120 using a foreign protocol of database 120, and/or via a low-level, specialized interface presented by database 120 for worker nodes 140. Although FIG. 3 shows three worker nodes (node 140A, node 140B, and node 140C), any suitable number of worker nodes may be employed. In some examples, the number of worker nodes may be varied to match a current throughput demand (e.g., based on an amount of data being requested in messages to virtual node 130).

Accordingly, accessing the second database 120 responsive to an incoming message for virtual node 130 may include communicatively coupling the state machine 102 to one or more worker nodes 140, to cause the one or more worker nodes 140 to communicatively couple to the second database 120. After communicatively coupled, the worker nodes 140 are configured to access data in the second database indicated by the incoming message for the virtual node.

In some examples, accessing the second database 120 further includes causing the worker nodes 140 to perform an additional data processing computation based at least on the data in the second database 120. Accordingly, the outgoing message from virtual node 130 to the native nodes of the first database 110 includes a result of the additional data processing computation returned by the worker nodes 140.

In other words, controller 100 maintains state machine 102 representing the expected behavior of virtual node 130, and delegates work to the worker nodes 140. Worker nodes 140 can access database 120 and perform additional computations, and eventually based at least on such access and computations, controller 100 causes messages to be sent on behalf of virtual node 130 to the native nodes of database 110 according to the protocol. In some examples, worker nodes 140 are configured to communicate with database 110 via controller 100, and controller 100 is accordingly configured to act as an intermediate between worker nodes 140 and database 110. Note that scalable database 120 may permit a large number of connections so the plurality of worker nodes 140 may achieve a large throughput.

In some examples, the plurality of worker nodes 140 may be configured to cooperate to perform a computation (e.g., data aggregation, summary, "map-reduce" computations, and the like). Accordingly, the worker nodes 140 may be communicatively coupled to each other in any suitable fashion (e.g., the example shown in FIG. 3 or any other network topology). For example, if a message is sent to virtual node 130 requesting a summary of a large amount of data (e.g., data which is replicated and available in database 120), then the three worker nodes 140A, 140B, and 140C may be configured to open up three connections to database 120, retrieve the large amount of data, aggregate summary results at one worker node 140A, and then provide the results to controller 100 to be sent on behalf of virtual node 130 to one or more native nodes of database 110.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 4:
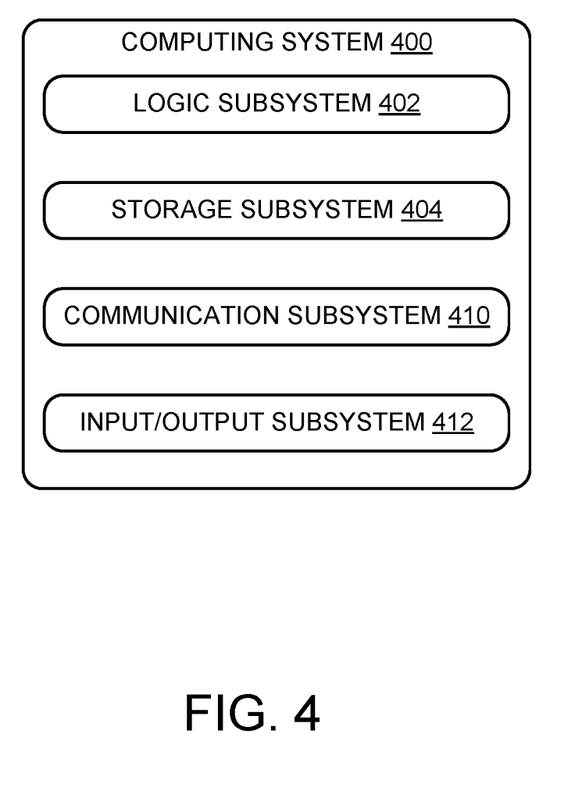
FIG. 4 shows an exemplary computing system.

FIG. 4 schematically shows a simplified representation of a computing system 400 configured to provide any to all of the compute functionality described herein. As an example, controller 100 may be a computing system 400. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 400 includes a logic subsystem 402 and a storage subsystem 404, and a communication subsystem 410. Computing system 400 may optionally include an input/output subsystem 412, and/or other subsystems not shown in FIG. 4.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 404 includes one or more physical devices configured to temporarily and/or permanently hold computer information such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. As an example, controller 100 may be instantiated as a logic machine, for example by executing instructions to implement method 200.

In an example, a method of bridging a first database and a second database includes: maintaining a state machine representing a state of a virtual node in the first database, wherein the state of the virtual node conforms to a first native protocol for native nodes of the first database, said first native protocol of the first database differing from a second, different native protocol of the second database; receiving an incoming message for the virtual node from one of the native nodes according to the first native protocol; based at least on the incoming message, accessing the second database; updating the state of the virtual node based at least on the incoming message according to the first native protocol; and based at least on the state of the virtual node as updated, sending an outgoing message to one or more of the native nodes according to the first native protocol. In this or any other example, the second database is configured to vary a computational capability of the second database, and the state machine is configured to advertise, to one or more of the native nodes, a corresponding computational capability of the virtual node according to the first native protocol. In this or any other example, the computational capability of the second database includes a scalable database storage capacity. In this or any other example, the computational capability of the second database includes a scalable data processing throughput. In this or any other example, the second database is a geospatially distributed database. In this or any other example, the incoming message is a heartbeat message from a native node of the first database, and wherein updating the state of the virtual node includes updating its internal representation of a state of the native node associated with the heartbeat message. In this or any other example, the outgoing message is a heartbeat message advertising a state of the virtual node according to the first native protocol. In this or any other example, the incoming message is a data payload message, according to the first native protocol, the data payload message including update data designated for replication by the virtual node, and wherein accessing the second database based at least on the incoming message includes updating the second database to include the update data. In this or any other example, the incoming message is a data request message indicating requested data to be provided by the virtual node, wherein accessing the second database based at least on the incoming message includes fetching the requested data from the second database, and wherein the outgoing message includes the requested data. In this or any other example, accessing the second database includes communicatively coupling the state machine to one or more worker nodes, to cause the one or more worker nodes to: communicatively couple to the second database; and access data in the second database indicated by the incoming message for the virtual node. In this or any other example, accessing the second database further includes causing the one or more worker nodes to perform an additional data processing computation based at least on the data in the second database, wherein the outgoing message includes a result of the additional data processing computation returned by the one or more worker nodes. In this or any other example, accessing the second database includes sending and receiving messages according to the second, different native protocol for foreign nodes of the second database. In this or any other example, accessing the second database includes invoking an application programming interface of the second database.

In an example, a computer system for bridging a first database and a second database includes: a processor; and a computer storage device holding instructions executable by the processor to: maintain a state machine representing a state of a virtual node in the first database, wherein the state of the virtual node conforms to a first native protocol for native nodes of the first database, said first native protocol of the first database differing from a second, different native protocol of the second database; receive an incoming message for the virtual node from one of the native nodes according to the first native protocol; based at least on the incoming message, access the second database; update the state of the virtual node based at least on the incoming message according to the first native protocol; and based at least on the state of the virtual node as updated, send an outgoing message to one or more of the native nodes according to the first native protocol. In this or any other example, the second database is configured to vary a computational capability of the second database, and the state machine is configured to advertise, to one or more of the native nodes, a corresponding computational capability of the virtual node according to the first native protocol. In this or any other example, the computational capability of the second database includes a scalable database storage capacity. In this or any other example, the computational capability of the second database includes a scalable data processing throughput. In this or any other example, accessing the second database includes communicatively coupling the state machine to one or more worker nodes, to cause the one or more worker nodes to: communicatively couple to the second database; and access data in the second database indicated by the incoming message for the virtual node. In this or any other example, accessing the second database further includes causing the one or more worker nodes to perform an additional data processing computation based at least on the data in the second database, wherein the outgoing message includes a result of the additional data processing computation returned by the one or more worker nodes.

In an example, a method of bridging a first database and a second database includes: maintaining a state machine representing a state of a virtual node in the first database, wherein the state of the virtual node conforms to a first native protocol for native nodes of the first database, said first native protocol of the first database differing from a second, different native protocol of the second database; receiving an incoming message for the virtual node from one of the native nodes according to the first native protocol; communicatively coupling the state machine to one or more worker nodes; based at least on the incoming message, causing the one or more worker nodes to communicatively couple to the second database and to access data in the second database indicated by the incoming message for the virtual node; updating the state of the virtual node based at least on the incoming message according to the first native protocol; and based at least on the state of the virtual node as updated, sending an outgoing message to one or more of the native nodes according to the first native protocol.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A method of bridging a first database and a second database, including:
   maintaining a state machine representing a state of a virtual node in the first database, wherein the state of the virtual node conforms to a first native protocol for a first plurality of native nodes of the first database, said first native protocol of the first database differing from a second, different native protocol for a second plurality of nodes of the second database;
   receiving an incoming message for the virtual node from one of the first plurality of native nodes according to the first native protocol;
   based at least on the incoming message, accessing one or more of the second plurality of nodes of the second database;
   updating the state of the virtual node in a manner determined at least by the incoming message and the first native protocol; and
   based at least on the state of the virtual node as updated, sending an outgoing message to one or more of the first plurality of native nodes of the first database according to the first native protocol.

2. The method of claim 1, wherein the second database is configured to vary a computational capability of the second database, and the state machine is configured to advertise, to one or more of the first plurality of native nodes, a corresponding computational capability of the virtual node according to the first native protocol.

3. The method of claim 2, wherein the computational capability of the second database includes a scalable database storage capacity.

4. The method of claim 2, wherein the computational capability of the second database includes a scalable data processing throughput.

5. The method of claim 1, wherein the second database is a geospatially distributed database.

6. The method of claim 1, wherein the incoming message is a heartbeat message from a native node of the first database, and wherein updating the state of the virtual node includes updating its internal representation of a state of the native node associated with the heartbeat message.

7. The method of claim 1, wherein the outgoing message is a heartbeat message advertising a state of the virtual node according to the first native protocol.

8. The method of claim 1, wherein the incoming message is a data payload message, according to the first native protocol, the data payload message including update data designated for replication by the virtual node, and wherein accessing one or more of the second plurality of nodes of the second database based at least on the incoming message includes updating the second database to include the update data.

9. The method of claim 1, wherein the incoming message is a data request message indicating requested data to be provided by the virtual node, wherein accessing one or more of the second plurality of nodes of the second database based at least on the incoming message includes fetching the requested data from the second database, and wherein the outgoing message includes the requested data.

10. The method of claim 1, wherein accessing one or more of the second plurality of nodes of the second database includes communicatively coupling the state machine to one or more worker nodes, to cause the one or more worker nodes to:
    communicatively couple to the second database; and
    access data in the second database indicated by the incoming message for the virtual node.

11. The method of claim 10, wherein accessing one or more of the second plurality of nodes of the second database further includes causing the one or more worker nodes to perform an additional data processing computation based at least on the data in the second database, wherein the outgoing message includes a result of the additional data processing computation returned by the one or more worker nodes.

12. The method of claim 1, wherein accessing one or more of the second plurality of nodes of the second database includes sending and receiving messages according to the second, different native protocol for the second plurality of nodes of the second database.

13. The method of claim 1, wherein accessing one or more of the second plurality of nodes of the second database includes invoking an application programming interface of the second database.

14. A computer system for bridging a first database and a second database, including:
    a processor; and
    a computer storage device holding instructions executable by the processor to:
       maintain a state machine representing a state of a virtual node in the first database, wherein the state of the virtual node conforms to a first native protocol for a first plurality of native nodes of the first database, said first native protocol of the first database differing from a second, different native protocol for a second plurality of nodes of the second database;
       receive an incoming message for the virtual node from one of the first plurality of native nodes according to the first native protocol;
       based at least on the incoming message, access one or more of the second plurality of nodes of the second database;
       update the state of the virtual node in a manner determined at least by the incoming message and the first native protocol; and
       based at least on the state of the virtual node as updated, send an outgoing message to one or more of the first plurality of native nodes of the first database according to the first native protocol.

15. The computer system of claim 14, wherein the second database is configured to vary a computational capability of the second database, and the state machine is configured to advertise, to one or more of the first plurality of native nodes of the first database, a corresponding computational capability of the virtual node according to the first native protocol.

16. The computer system of claim 15, wherein the computational capability of the second database includes a scalable database storage capacity.

17. The computer system of claim 15, wherein the computational capability of the second database includes a scalable data processing throughput.

18. The computer system of claim 14, wherein accessing one or more of the second plurality of nodes of the second database includes communicatively coupling the state machine to one or more worker nodes, to cause the one or more worker nodes to:
   communicatively couple to the second database; and
   access data in the second database indicated by the incoming message for the virtual node.

19. The computer system of claim 14, wherein accessing one or more of the second plurality of nodes of the second database further includes causing the one or more worker nodes to perform an additional data processing computation based at least on the data in the second database, wherein the outgoing message includes a result of the additional data processing computation returned by the one or more worker nodes.

20. A method of bridging a first database and a second database, including:

maintaining a state machine representing a state of a virtual node in the first database, wherein the state of the virtual node conforms to a first native protocol for a first plurality of native nodes of the first database, said first native protocol of the first database differing from a second, different native protocol for a second plurality of nodes of the second database;

receiving an incoming message for the virtual node from one of the first plurality of native nodes according to the first native protocol;

communicatively coupling the state machine to one or more worker nodes;

based at least on the incoming message, causing the one or more worker nodes to communicatively couple to one or more of the second plurality of nodes of the second database and to access data in the second database indicated by the incoming message for the virtual node;

updating the state of the virtual node based at least on the incoming message according to the first native protocol; and based at least on the state of the virtual node as updated, sending an outgoing message to one or more of the first plurality of native nodes of the first database according to the first native protocol.

* * * * *